United States Patent
Ben-Artzi et al.

(10) Patent No.: US 8,423,551 B1
(45) Date of Patent: Apr. 16, 2013

(54) CLUSTERING INTERNET RESOURCES

(75) Inventors: Aner Ben-Artzi, Los Angeles, CA (US);
Kirill Buryak, Sunnyvale, CA (US);
Glenn M. Lewis, Costa Mesa, CA (US);
Jun Peng, San Ramon, CA (US); Nadav Benbarak, Mountain View, CA (US)

(73) Assignee: Google Inc., Mountain View, CA (US)

( * ) Notice: Subject to any disclaimer, the term of this patent is extended or adjusted under 35 U.S.C. 154(b) by 92 days.

(21) Appl. No.: 12/940,905

(22) Filed: Nov. 5, 2010

(51) Int. Cl.
*G06F 17/30* (2006.01)

(52) U.S. Cl.
USPC .......................................... 707/737

(58) Field of Classification Search .............. 707/3, 736, 707/737; 725/46
See application file for complete search history.

(56) References Cited

U.S. PATENT DOCUMENTS

| | | | |
|---|---|---|---|
| 2008/0244655 A1* | 10/2008 | Mattila et al. | 725/46 |
| 2009/0228452 A1* | 9/2009 | Zhang et al. | 707/3 |
| 2010/0036726 A1 | 2/2010 | Gallet | |
| 2010/0145940 A1* | 6/2010 | Chen et al. | 707/736 |

* cited by examiner

*Primary Examiner* — Etienne Leroux
(74) *Attorney, Agent, or Firm* — Fish & Richardson P.C.

(57) ABSTRACT

Among other disclosed subject matter, a computer-implemented method includes receiving one or more keywords and identifying a plurality of content items. The content items comprise network content that includes the one or more keywords. The method also includes clustering the plurality of content items and identifying a topic associated with each cluster. The method also includes determining a relative importance of a particular topic and analyzing clusters associated with the particular topic to determine opinion data associated with the particular topic. The method includes preparing a report based on the clusters, relative importance and the opinion data and display the report to a user.

15 Claims, 5 Drawing Sheets

| Topic | Number of Resources | Average number of page views | Average Page Rank | Average Sentiment Score |
|---|---|---|---|---|
| Cleanliness of Room | 12 | 40 | 78 | 90 |
| Comfort of Bed | 24 | 30 | 82 | 120 |
| Rude Front Desk Employees | 5 | 50 | 98 | 50 |
| Satisfaction of Complementary Breakfast | 9 | 12 | 55 | 18 |
| | | | | |
| | | | | |

CLUSTERING INTERNET RESOURCES

BACKGROUND

This document relates to information presentation.

The Internet provides access to a wide variety of resources, including web pages for particular topics, reviews of products and/or services, news articles, editorials and blogs. The authors of these resources can express their opinions and/or views related to a myriad of topics such a product and/or service, politics, political candidates, fashion, design, etc. For example, an author can create a blog entry supporting a political candidate and express their praise in the candidate's position regarding fiscal matters or social issues. As another example, authors can create a restaurant review on a blog or on an online review website and provide their opinions of the restaurant using a numerical rating (e.g., three out of five stars), a letter grade (e.g., A+) and/or a description of their dining experience to indicate their satisfaction with the restaurant.

SUMMARY

This document describes techniques for clustering Internet resources.

In one aspect, a method includes receiving one or more keywords and identifying a plurality of content items. The content items comprise network content that includes the one or more keywords. The method also includes clustering the plurality of content items and identifying a topic associated with each cluster. The method also includes determining a relative importance of a particular topic and analyzing clusters associated with the particular topic to determine opinion data associated with the particular topic. The method includes preparing a report based on the clusters, relative importance and the opinion data and displaying the report to a user.

Particular aspects of the subject matter described can be implemented to realize one or more of the following advantages. Resources can be collected and analyzed to provide an understanding of the public perception associated with a particular topic or subject.

The details of one or more embodiments are set forth in the accompanying drawings and the description below. Other features, objects, and advantages of the invention will be apparent from the description and drawings, and from the claims.

DESCRIPTION OF DRAWINGS

FIG. 2 is an illustration of an example report generated by the cluster analysis engine.

Like reference symbols in the various drawings indicate like elements.

DETAILED DESCRIPTION

Systems and methods are described for clustering online resources, such as blog entries, news articles, product/service reviews. The data analysis system receives resources related to a keyword or search query, such as web sites, search queries, and/or online articles, and clusters the resources to identify a topic contained in each cluster. The data analysis system then analyzes each cluster and applies a label to each cluster. The labels identify the topics contained in each cluster. The data analysis system then analyzes the clusters and the resources included in each cluster to determine various metrics. A report can be prepared based on the clusters and the metrics. The report can include information such as the number of resources contained in each cluster, an average number of page views associated with each cluster, an average relevance score associated with each cluster, and information associated with positive and negative sentiments contained in each cluster.

Advantageously, the described system can provide one or more benefits, such as providing an understanding of how individuals and/or organizations view a particular topic, such as a product, a service, a restaurant, a destination, a political opinion, a political candidate, an event, fashion, television show, a movie, a commercial, or any other topic for which an opinion can be formed. This information can be sold and allows the buyer to gauge public perception associated with a particular subject and improve a product, service, etc. or make changes based on the public opinion.

Figure 1:
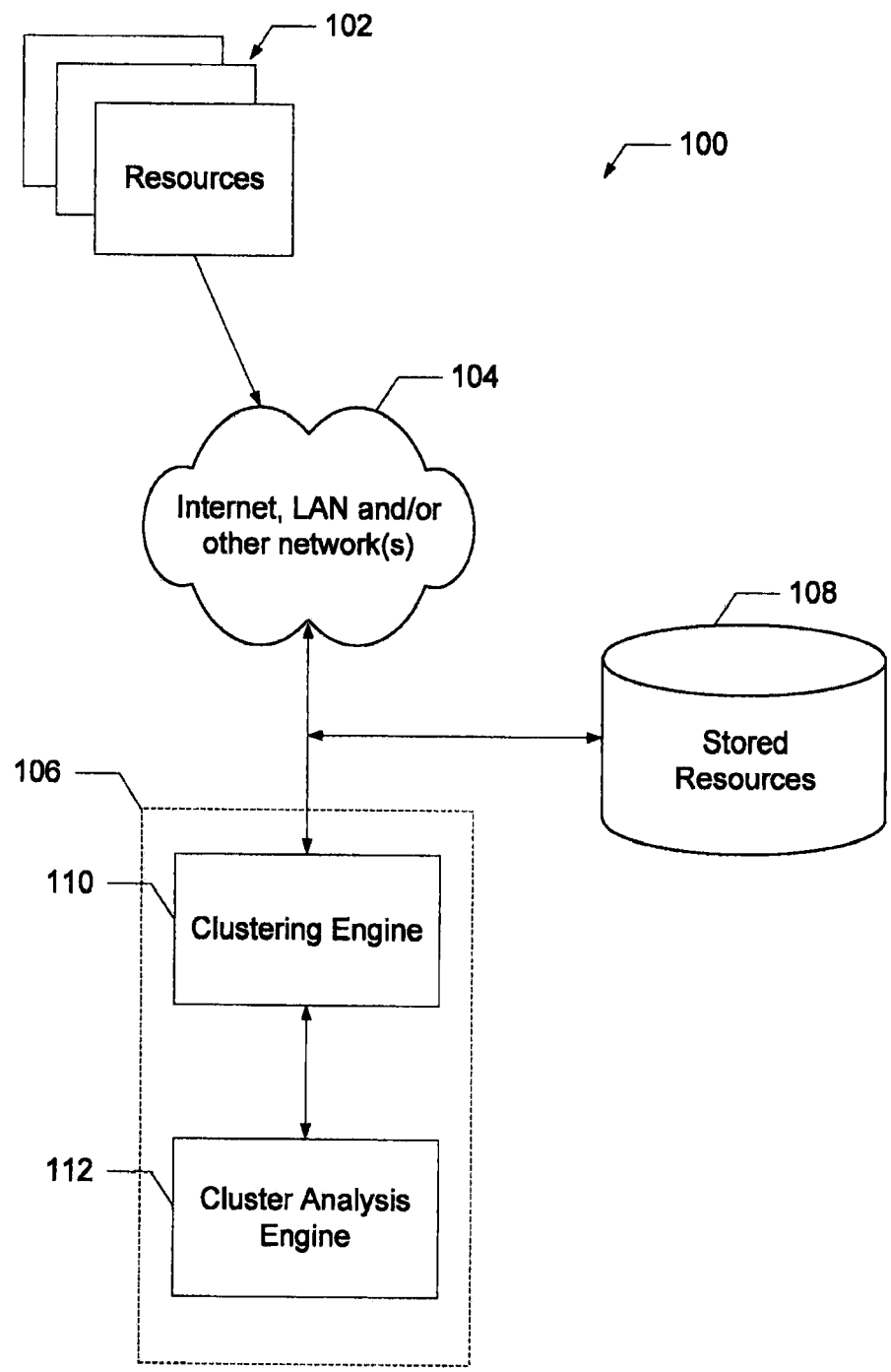
FIG. 1 is a block diagram of an example environment in which a data analysis system generates cluster information and provides a report based on the cluster information.

FIG. 1 is a block diagram of an example environment 100 in which a data analysis system generates cluster information and provides a report based on the cluster information. The environment 100 includes a plurality of online resources 102, a network 104, a data analysis system 106 and a database of stored resources 108.

The plurality of online resources 102 can be any data that can be provided by a web server(s) and accessed by the data analysis system 106. Resources 102 can include HTML pages, word processing documents, portable document format (PDF) documents and/or other format types. Resources 102 can also include blogs, search queries, online reviews, newspaper and/or magazine articles, and/or editorials. In some implementations, the resources 102 can be accessed by a computer program or device that accesses the world wide web. One example computer program is a web crawler. Indexes can be created for the resources 102. The indexes of the resources 102 can describe the resource 102 and/or contain the content of the resources 102. A web crawling application can access resources 102 that contain a particular keyword or a combination of keywords (e.g., one or more keywords joined by one or more Boolean operators or other logical operator) and/or satisfy a search query. In some implementations, the resources 102 are copied and stored in a database of stored resources 108. The database 108 can be any type of database or memory that can store the resources 102. In some implementations, the database 108 can include search queries previously received by a search engine.

The network 104 can be any type of network such as a local area network (LAN), wide area network (WAN), the Internet, or a combination thereof. The network 104 facilitates connectivity between the resources 102, the data analysis system 106, and the database of stored resources 108.

The data analysis system 106 includes a clustering engine 110 and a cluster analysis engine 112. The clustering engine 110 can access the resources 102 and/or the stored resources and identify the resources 102 that contain a particular keyword or a combination of keywords and/or satisfy a search query (hereinafter "set of relevant resources."). For example, the clustering engine 110 can access resources 102 that are associated with a consumer product and contain a keyword, such as "D40," or a combination of keywords, such as ("Beta Hotels" AND "smelly rooms."). In some implementations, the particular keyword, combination of keywords and/or search query can be provided by a user of the data analysis system 106 and chosen to identify resources relevant to a product or service of interest to the user. For example, the user of the data analysis system 106 can be a politician that wishes to understand how the public is reacting to the candidate's campaign promises and can provide keywords associated with a particular campaign promise or keywords associated with the candidate's name and political party. As another example, the user can be a public relations or marketing firm that wants to understand the public's perception of a consumer product and can provide the product's name to the clustering engine 110 as the keyword.

The clustering engine 110 can cluster the resources to discover topics included in the set of relevant resources. The topics can be any topic contained in the set of relevant resources. For example, a set of relevant resources associated with a particular hotel can include topics such as the comfort level associated with a hotel room, the cleanliness of a hotel pool, overall customer satisfaction, and/or complaints or compliments related to customer service. Various clustering algorithms can be used by the clustering engine 110. For example, the clustering engine 110 can use a distributed exchange algorithm to cluster the set of relevant resources and discover the topics included in the set of relevant resources. In some implementations, the clustering algorithm is applied after an information retrieval/text mining algorithm, such as a term frequency-inverse document frequency algorithm, is applied to the set of relevant resources to identify features, such as the content of the resources (e.g., words, number and/or phrases included in the resources), contextual features of the resources (e.g., the URL of the resource) and meta-data associated with the resources (e.g., tags associated with the resource) in each resource that are relevant to the keyword and/or represent the majority of the topic information (i.e., topic features), which can be used for clustering. In some implementations, the clustering engine 110 attempts to group the set of relevant resources in various groupings until an optimal or near optimal grouping is identified. Typically, the resources contained in an optimal or near optimal grouping are all resources that are related or describe a similar topic.

In some implementations, the clustering engine 110 can form a user-specified number of clusters. For example, the number of clusters can be specified by the user of the data analysis system 106. The number of clusters can influence the topics identified in each of the clusters. For example, if the user specifies a relatively small number of clusters, then a larger number of resources will be contained in each cluster and multiple or broader topics can be contained in a single cluster. If the user specifies a larger number of clusters, then fewer resources will be contained in a single cluster and each cluster can represent a single or more narrow topic.

The cluster analysis engine 112 can receive the clusters generated by the clustering engine 110 and analyze the resources contained in each cluster to apply a label/descriptor to each cluster. The label/descriptor can be any type of token, word, phrase, sentence, or a combination of topic features. In some implementations, the label can be chosen to identify the topic(s) contained in the cluster or can be an arbitrary string in accordance to a naming convention specified by the user of the data analysis system 106. In some implementations, multiple clusters can be related to the same topic or similar topics. For example, two clusters can be related to hotel room comfort: a first cluster can be related to the cleanliness of a hotel room and a second cluster can be related to the comfort of a hotel bed. These two clusters can both be associated with a label, such as "Hotel Room Comfort." The cluster analysis engine 112 can use various algorithms to analyze the resources contained in each cluster and generate a label for the cluster. For example, a term frequency-inverse document frequency algorithm can be applied to determine the word, phrase or combination of topic feature(s) that have the highest term frequency-inverse document frequency scores and use the topic feature(s) as the label for each cluster.

In some implementations, a user of the data analysis engine 106 can review the clusters generated by the clustering engine 110 and apply a label/descriptor to each cluster. For example, the user of the data analysis system 106 can review each or a subset of the resources in a cluster and determine which label should be associated with the cluster.

The cluster analysis engine 112 can also analyze the clusters and the resources included in each of the clusters and determine metrics associated with each resource and/or topic/cluster. For example, the cluster analysis engine 112 can determine the number of resources associated with a topic/cluster versus the number of resources included in the set of relevant resources (i.e. a frequency). As indicated above, multiple clusters can be associated with a single topic and the cluster analysis engine 112 can determine the number of resources associated with the topic by summing the number of resources in each cluster that have a common label. In some implementations, the cluster analysis engine 112 can determine the number of page views each resource in a cluster/topic has received and determine an average number of page views for each topic/cluster. For example, the cluster analysis engine 112 can determine the number of page views a resource received by accessing a database that stores page view information or based on analytic information that can be accessed by the cluster analysis engine 112.

In some implementations, the cluster analysis engine 112 can calculate a relevance score associated with a topic/cluster to determine the relative importance of each topic/cluster. For example, a relevance score associated with a topic/cluster can be calculated by calculating a relevance score for each resource included in the topic/cluster and determining the average relevance score for the topic/cluster. Various algorithms to compute the relevance score can be used. The relevance score can be used to rank resources and/or determine whether a particular resource is more relevant to a given set of keywords than another resource. In some implementations, the relevance score is based on various factors or a combination of factors including, but not limited to, the number of page views a resource has received, the number of occurrences keyword(s) in a resource and/or the context in which the keyword(s) appear in the resource (e.g., keyword appears in the title or in meta-data).

In some implementations, the relevance score can be a measure of global importance. For example, a resource that is referenced by or linked to 1,000 resources can have a relevance score that is less than another resource that is referenced by or linked to 2,000 resources. As another example, some resources can have user/reader votes associated with the resources (e.g., a like or share button) and the resources with a higher number of user/reader votes can have a relevance score that is greater than a resource with a fewer number of user/reader votes.

In some implementations, the cluster analysis engine 112 can determine a sentiment score for a given topic/cluster. For example, the cluster analysis engine 112 can calculate the difference in the total number of positive sentiment words and the total number of negative sentiment words to determine the sentiment score for a resource and determine an average sentiment score for the topic/cluster. Various algorithms can be used to identify positive and negative sentiment words. For example, the cluster analysis engine 112 can include a database that identifies words or phrases that are associated with a positive sentiment and words or phrases that are associated with a negative sentiment. In addition, the database can include grammatical rules or syntax rules that indicate when a sentiment associated with a word is being modified. For example, the database can include a rule that specifies when a positive sentiment word, such as "good" or "great," is preceded by the word "not," the word is no longer a deemed positive sentiment word for a given resource.

In some implementations, the cluster analysis engine 112 can determine a sentiment score for a topic/cluster by analyzing resources included in a topic/cluster to determine if the resource includes an indicator of sentiment, such as a user rating, a grade or other satisfaction metric. The cluster analysis engine 112 can normalize the indicators of sentiment and determine an average sentiment score based on the normalized indicators of sentiment. For example, the cluster analysis engine 112 can determine that three of five stars is equal to a score of 60 and a B+ rating is equal to 88. In some implementations, the cluster analysis engine 112 can identify indicators of sentiment by comparing the content of the resource to a database that includes indicators of sentiment.

In some implementations, the cluster analysis engine 112 can determine whether the sentiment score represents a positive, negative or neutral sentiment. For example, if the cluster analysis engine 112 determines that the difference of the number of positive sentiment words and the number of negative sentiment words is positive and the absolute value of the difference is greater than a predetermined threshold, then the sentiment score indicates a positive sentiment. If the cluster analysis engine 112 determines that the difference of the number of positive sentiment words and the number of negative sentiment words is negative and the absolute value of the difference is greater than the predetermined threshold, then the sentiment score can indicate a negative sentiment. If the absolute value of the difference of the number of positive sentiment words and the number of negative sentiment words is less than the predetermined threshold, the sentiment score can indicate a neutral sentiment.

The cluster analysis engine 112 can generate a report based on the metrics associated with each topic. For example, the report can be similar to a spreadsheet and include columns identifying the topic, the number of documents in each topic, an average number of page views associated with the topic and the average page rank associated with the topic and rows corresponding to each label and/or topic. FIG. 2 is an illustration of an example report 200 generated by the cluster analysis engine 112. In some implementations, the report can be provided to the user of the data analysis system 106 or can be sold to a person or organization.

Figure 3:
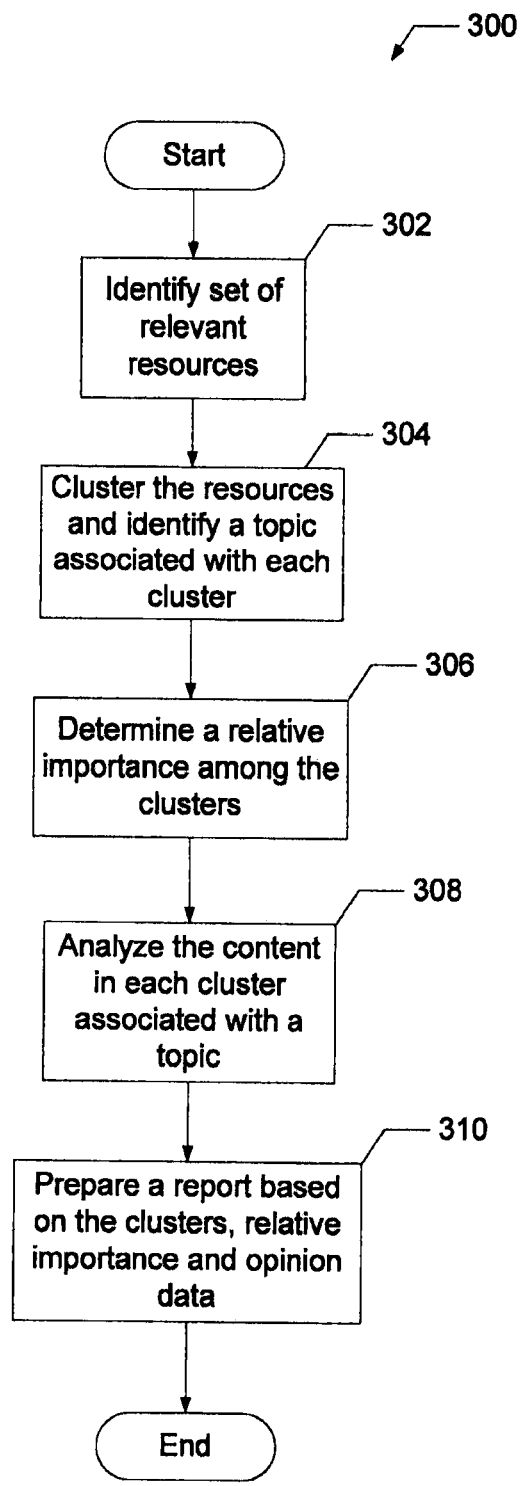
FIG. 3 is a flowchart of an example process for generating a report.

FIG. 3 is a flowchart of an example process for generating a report. The process 300 begins by identifying a set of relevant resources (stage 302). For example, the clustering engine 110 can receive a keyword or a combination of keywords and/or a search query and identify resources 102 that include the keyword(s) or satisfy the search query. In some implementations, the clustering engine 110 can access the database of stored resources 108 and identify resources that include the keyword(s) or satisfy the search query.

After the set of relevant resources are identified (stage 302), clusters of resources are formed to identify topics included in the set of relevant resources (stage 304). For example, the clustering engine 110 can apply a distributed exchange algorithm to cluster the set of relevant resources and identify the topics. In some implementations, the clustering engine 110 can apply a term frequency-inverse document frequency algorithm to identify topic features in each resource and then cluster the set of relevant resources using the topic features. Various clustering algorithms can be used.

Each cluster is then analyzed to identify a topic associated with the cluster (stage 304). For example, the cluster analysis engine 112 can identify a topic associated with each cluster by analyzing the resources included in the cluster and can associate a label with each cluster. The label can identify the topic(s) included in the cluster, and multiple clusters can have the same label or similar labels to indicate that the clusters include related or similar topics (e.g., a politician's views on freedom of speech and the politician's stance on anonymous donors). In some implementations, the cluster analysis engine 112 can apply a term frequency-inverse document frequency algorithm to identify the topic(s) associated with the cluster(s) and the label to be applied to the cluster(s).

At stage 306, a relative importance among the topics/clusters is determined. For example, the cluster analysis engine 112 can determine the number of resources contained in each topic/cluster. In addition, the cluster analysis engine 112 can determine a relevance score associated with each resource contained in a cluster/topic, which provides an indication of how relevant a resource is to a given set of keywords and/or search query. The cluster analysis engine 112 can generate an average relevance score associated with each topic/cluster. In some implementations, the cluster analysis engine 112 can determine the number of page views each resource within a topic/cluster has received and determine an average page view for each topic/cluster.

At stage 308, the resources included in each topic/cluster are analyzed to determine opinion data associated with the topic/cluster. For example, the cluster analysis engine 112 can analyze the resources included in each topic/cluster to determine a sentiment score associated with each topic/cluster and calculate an average sentiment score for each topic. In some implementations, the cluster analysis engine 112 can calculate a difference between the number of positive sentiment words and negative sentiment words included in a resource to determine the sentiment score for each resource included in a topic/cluster. In some implementations, the cluster analysis engine 112 can determine if a resource includes indicia of sentiment, such as a grade or rating, and can include the indicia of sentiment in the sentiment score.

At stage 310, a report is prepared based on the clusters, the relative importance of each of the clusters and the opinion data. For example, the cluster analysis engine 112 can generate a report including the labels associated with each topic, an average number of page views associated with each topic, an average relevance score associated with each topic and an average sentiment score associated with each topic. In some implementations, the report can be provided to a user of the data analysis system 106 and/or sold to an individual or organization. In some implementations, the report is displayed to a user.

Figure 4:
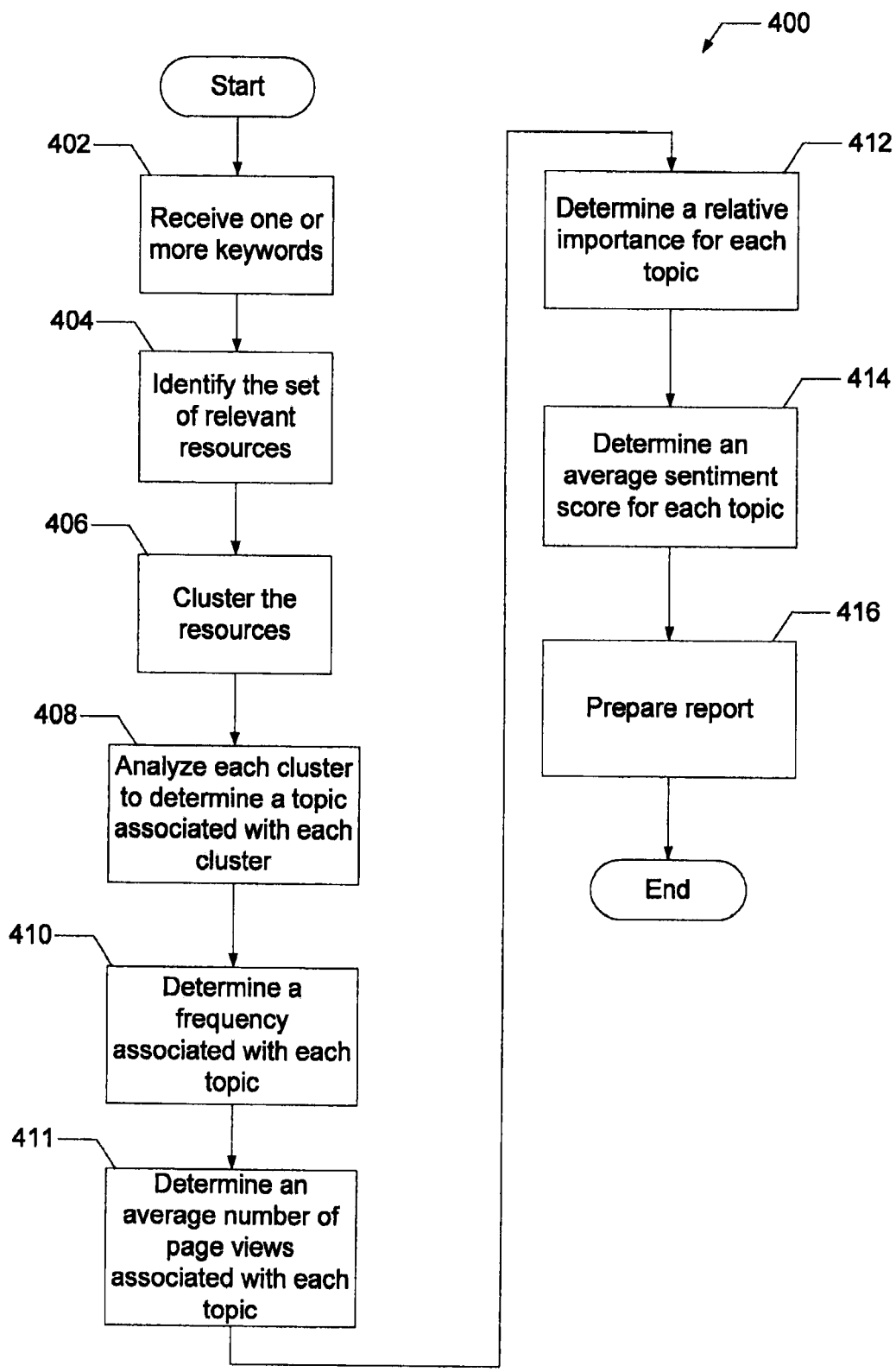
FIG. 4 is a flowchart of an example process for generating a report.

FIG. 4 is a flowchart of an example process for generating a report. The example process 400 begins by receiving one or more keywords (stage 402). For example, the clustering engine 110 can receive a keyword or a combination of keywords from a user of the data analysis system 102. In some implementations, the clustering engine 110 can receive a search query from the user. The keyword(s) or search query can be related to a subject that the user is interested in understanding the public perception associated with the subject.

At stage 404, the set of relevant resources are identified. For example, the clustering engine 110 can identify resources 102 that include the keyword(s) or satisfy the search query. In some implementations, the clustering engine 102 accesses the database of stored resources 108, accesses indexes describing the resources 102 and/or crawls the Internet to identify the set of relevant resources to identify the set of relevant resources.

At stage 406, the set of relevant resources is clustered to identify topics included in the set of relevant resources. For example, the clustering engine 110 can apply various clustering algorithms to identify the topics. In some implementations, the clustering engine 110 first applies a term frequency-inverse document frequency algorithm to the set of relevant resources to identify topic features. The topic features are then used by the clustering engine 110 to generate the clusters of resources.

At stage 408, each cluster is analyzed to determine a topic associated with the cluster. For example, the cluster analysis engine 112 can analyze the resources included in a cluster and determine a label/descriptor, which can identify the topic associated with the cluster, to be applied to the cluster. In some implementations, the cluster analysis engine 112 can apply a term frequency-inverse document frequency algorithm to identify the label to be associated with the cluster. In some implementations, multiple clusters will have similar labels or a common label to indicate that the clusters are associated with related topics or the same topic. In some implementations, a cluster can be associated with multiple labels to indicate that the cluster is associated with multiple topics.

At stage 410, a frequency associated with each topic is determined. For example, the cluster analysis engine 112 can determine the number of resources included in each topic/cluster. In some implementations, the cluster analysis engine 112 counts the number of resources in each topic/cluster.

At stage 411, an average number of page views associated with each topic can be calculated. For example, the cluster analysis engine 112 can determine the number of page views each resource included in the topic/cluster has received and determine an average number of page views. In some implementations, the cluster analysis engine 112 can access a database that stores page views associated with each resource or can receive page view information from a system that monitors analytic or metric information associated with the resources.

At stage 412, a relative importance for each topic/cluster is determined. For example, the cluster analysis engine 112 can determine an average relevance score associated with each topic/cluster. In some implementations, the cluster analysis engine 112 can determine a relevance score for each resource associated with the topic/cluster and an average relevance score can be computed for each topic/cluster. Various algorithms can be used to calculate the relevance score.

At stage 414, an average sentiment score is calculated for each topic/cluster. For example, the cluster analysis engine 112 can determine the number of positive and negative sentiment words included in each resource associated with a topic/cluster and then determine the average sentiment score for the topic/cluster. In some implementations, the cluster analysis engine 112 can use a database or dictionary of positive and negative sentiment words to identify the positive and negative sentiment words.

At stage 416, a report based on the topics/clusters, the average relevance scores, the average page views, and the average sentiment score can be prepared. For example, the cluster analysis engine 112 can prepare a report that includes a column for a topic, the number of documents associated with the topic, an average number of page views associated with the topic, an average relevance score associated with the topic and an average sentiment score associated with the topic. The report can also include rows for each label identified by the cluster analysis engine 112. The report can be provided (or displayed) to an individual or organization and used to improve/determine public perception and/or improve a product, service or public relations.

Figure 5:
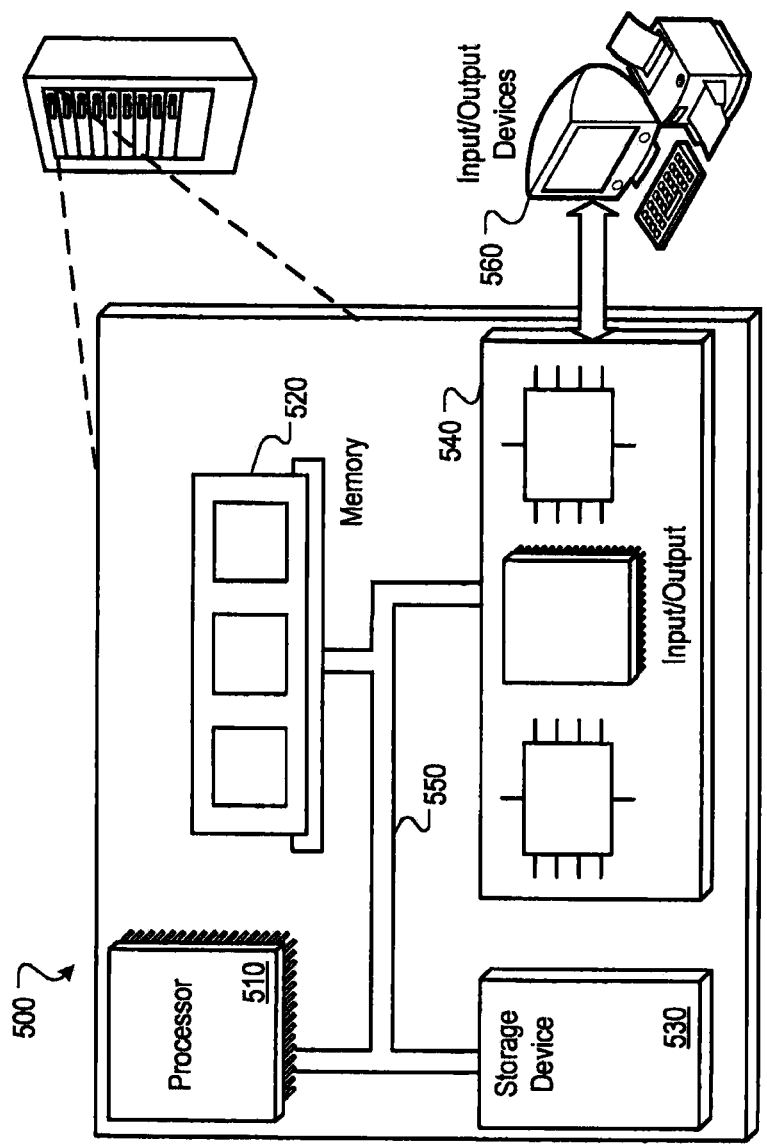
FIG. 5 is a block diagram of an example computer system that can be used to implement the data analysis system.

FIG. 5 is block diagram of an example computer system 500 that can be used to implement the data analysis system 106. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, or some other large capacity storage device.

The input/output device 540 provides input/output operations for the system 500. In one implementation, the input/output device 540 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

The various functions of the data analysis system 106 can be realized by instructions that upon execution cause one or more processing devices to carry out the processes and functions described above. Such instructions can comprise, for example, interpreted instructions, such as script instructions, e.g., JavaScript or ECMAScript instructions, or executable code, or other instructions stored in a computer readable medium. The data analysis system 106 can be distributively implemented over a network, such as a server farm, or can be implemented in a single computer device.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, a processing system. The computer readable medium can be a machine readable storage device, a machine readable storage substrate, a memory device, or a combination of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Although a few implementations have been described in detail above, other modifications are possible. Moreover, other mechanisms for clustering resources and preparing reports based on the clusters may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
   receiving a user request referencing one or more keywords;
   identifying a plurality of content items, wherein the content items comprise network content that includes the one or more keywords;
   clustering the plurality of content items into a plurality of clusters, and identifying a topic associated with each cluster, wherein the identified topics relate to the one or more keywords;
   for each topic from among the identified topics corresponding to the clusters,
      computing a frequency associated with the topic;
      computing a relevance rank associated with each content item associated with the topic, and determining a relevance rank associated with the topic based on the computed relevance ranks;
      obtaining a number of page views associated with each content item associated with the topic, and determining a number of page views associated with the topic based on the obtained number of page views; and
      determining a sentiment score associated with the topic;
   preparing a report regarding the identified topics corresponding to the clusters, wherein the report comprises, for each topic from among the identified topics, the a computed frequency associated with the topic, the determined relevance rank associated with the topic, the determined number of page views associated with the topic, and the determined sentiment score associated with the topic; and
   displaying the report in response to the user request referencing the one or more keywords to which the identified topics relate.

2. The computer-implemented method of claim 1 wherein the network content comprise websites including at least one of a user-review, a blog posting, an article, a search query or a news item.

3. The computer-implemented method of claim 1 wherein the one or more keywords comprises a term that is descriptive of a product or service.

4. The computer-implemented method of claim 1 further comprising specifying a number of clusters to be formed prior to clustering the plurality of content items, wherein the number of clusters influences the identification of topics associated with each cluster.

5. The computer-implemented method of claim 1, wherein said determining the sentiment score comprises:
   analyzing a rating associated with each content item associated with the topic, wherein the rating comprises a satisfaction metric.

6. The computer-implemented method of claim 1, wherein said determining the sentiment score comprises:
   analyzing each content item associated with the topic to determine a difference between a number of positive-sentiment words and a number of negative-sentiment words.

7. The method of claim 6 further comprising comparing the number of positive sentiment words to the number of negative sentiment words and determining an overall impression for a given content item related to the topic.

8. The method of claim 6 wherein the overall impression is positive, negative or neutral.

9. The method of claim 8 wherein the overall impression is neutral if the number of positive sentiment words compared to the number of negative sentiment words is within a predetermined threshold.

10. A system comprising:
    one or more hardware processors; and
    a non-transitory computer readable medium encoding instructions that, when executed by the one or more hardware processors, cause the system to perform operations comprising:
       receiving a user request referencing one or more keywords,
       identifying a plurality of content items, wherein the content items comprise network content that includes the one or more keywords,
       clustering the plurality of content items into a plurality of clusters, and identifying a topic associated with each cluster, wherein the identified topics relate to the one or more keywords,
       for each topic from among the identified topics corresponding to the clusters,
          computing a frequency associated with the topic,
          computing a relevance rank associated with each content item associated with the topic, and determining a relevance rank associated with the topic based on the computed relevance ranks,
          obtaining a number of page views associated with each content item associated with the topic, and determining a number of page views associated with the topic based on the obtained number of page views, and
          analyzing a rating associated with each content item associated with the topic, wherein the rating comprises a satisfaction metric, and determinig a sentiment score associated with the topic based on the analyzed ratings, preparing a report regarding the identified topics corresponding to the clusters, wherein the report comprises, for each topic from among the identified topics, the computed frequency associated with the topic, the determined relevance rank associated with the topic, the determined number of page views associated with the topic, and the determined sentiment score associated with the topic, and displaying the report in response to the user request referencing the one or more keywords to which the identified topics relate.

11. The system of claim 10, wherein the operations further comprise specifying a number of clusters to be formed prior to clustering the plurality of content items, wherein the number of clusters influences the identification of topics associated with each cluster.

12. The system of claim 10, wherein, for each topic from among the identified topics corresponding to the clusters, the operations further comprise analyzing each content item associated with the topic, and determinig a difference associated with the content item between a number of positive-sentiment words and a number of negative-sentiment words, and the operation of determining the sentiment score associated with the topic is performed based on a combination of the analyzed ratings and the determined differences.

13. A non-transitory computer readable medium encoded with a computer program comprising instructions that, when executed by data processing apparatus, cause the data processing apparatus to perform operations comprising:

receiving a user request referencing one or more keywords;

identifying a plurality of content items, wherein the content items comprise Internet content that includes the one or more keywords;

clustering the plurality of content items into a plurality of clusters, and identifying a topic associated with each cluster from among the clusters, wherein the identified topics corresponding to the clusters relate to the one or more keywords;

for each topic from among the identified topics corresponding to the clusters, computing a frequency associated with the topic;

computing a relevance rank associated with each content item associated with the topic, and determining a relevance rank associated with the topic based on the computed relevance ranks;

obtaining a number of page views associated with each content item associated with the topic, and determining number of page views associated with the topic based on the obtained number of page views; and analyzing each content item associated with the topic, computing a difference associated with the content item between a number of positive-sentiment words and a number of negative-sentiment words, and determining a sentiment score associated with the topic based on the computed differences;

preparing a report regarding the identified topics corresponding to the clusters, wherein the report comprises, for each topic from among the identified topics, the computed frequency associated with the topic, the determined relevance rank associated with the topic, the determined number of page views associated with the topic, and the determined sentiment score associated with the topic; and displaying the report in response to the user request referencing the one or more keywords to which the identified topics relate.

14. The non-transitory computer readable medium of claim 13, wherein the operations further comprise selecting a number of clusters prior to clustering the plurality of content items, wherein the number of clusters influences the identification of topics associated with each cluster.

15. The non-transitory computer readable medium of claim 13, wherein, for each topic from among the identified topics corresponding to the clusters, the operations further comprise analyzing a rating associated with each content item associated with the topic, wherein the rating comprises a satisfaction metric, and the operation of determining the sentiment score associated with the topic is performed based on a combination of the computed differences and the analyzed ratings.

* * * * *

UNITED STATES PATENT AND TRADEMARK OFFICE
CERTIFICATE OF CORRECTION

PATENT NO. : 8,423,551 B1
APPLICATION NO. : 12/940905
DATED : April 16, 2013
INVENTOR(S) : Aner Ben-Artzi It is certified that error appears in the above-identified patent and that said Letters Patent is hereby corrected as shown below:

In the Claims:

Column 11, line 65, delete "the a" and insert -- the -- therefor.

Column 13, line 1, delete "determinig" and insert -- determining -- therefor.

Column 13, line 23, delete "determinig" and insert -- determining -- therefor.

Column 14, line 9, before "number" insert -- a --.

Signed and Sealed this
Ninth Day of July, 2013

Teresa Stanek Rea
*Acting Director of the United States Patent and Trademark Office*